Dec. 17, 1929. J. E. LEWIS 1,740,107
ANNUNCIATING SWITCH DEVICE
Filed March 31, 1926
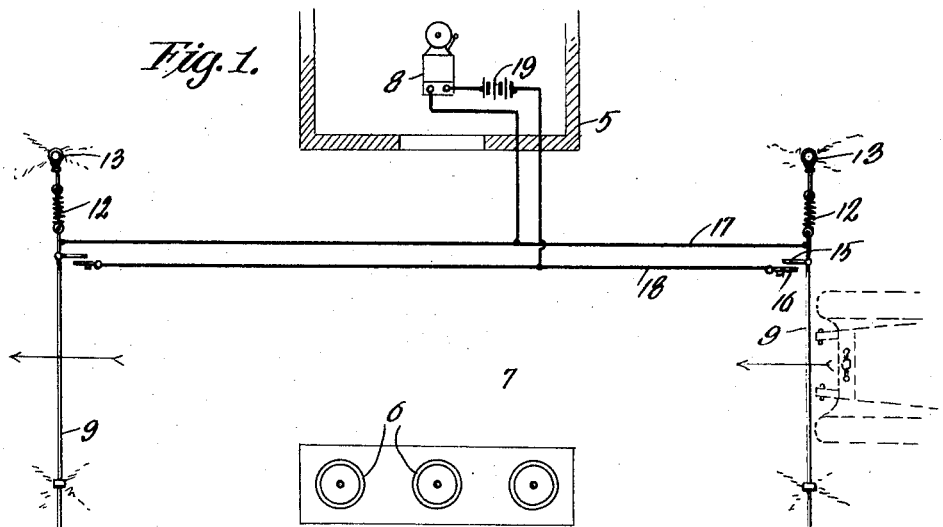
Fig. 1.
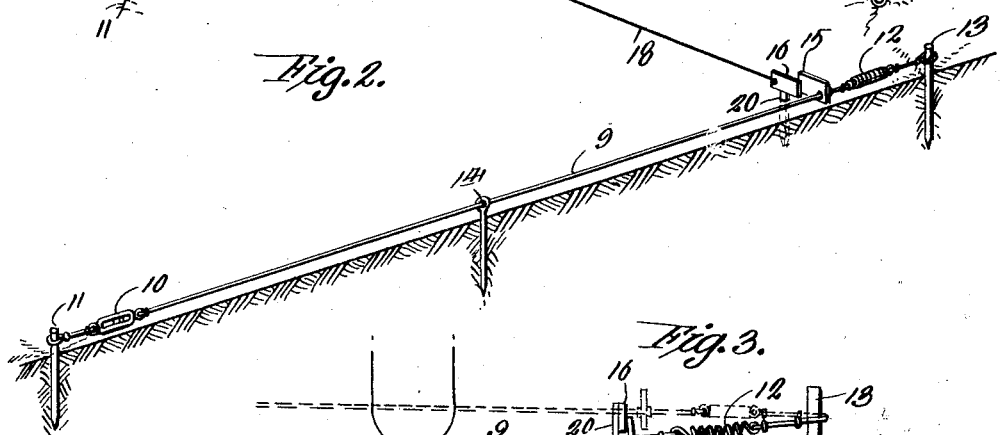
Fig. 2.
Fig. 3.
Inventor
JAMES E. LEWIS Patented Dec. 17, 1929

1,740,107

UNITED STATES PATENT OFFICE

JAMES E. LEWIS, OF FORT SMITH, ARKANSAS

ANNUNCIATING SWITCH DEVICE

Application filed March 31, 1926. Serial No. 98,926.

This invention relates to annunciating devices, and has more particular reference to a device for automatically announcing the arrival of a motor vehicle at a motor vehicle service station or the like, whereby the driver of the vehicle may be assured of prompt service.

An object of the present invention is to provide a motor vehicle actuated annunciating device which is extremely simple and durable in construction as well as efficient in operation.

A further object is to provide improved means including an element depressible by the wheels of a motor vehicle for rendering an annunciator operative.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a somewhat diagrammatic plan view illustrating a motor vehicle service station equipped with an annunciating device constructed in accordance with the present invention;

Figure 2 is a fragmentary perspective view illustrating details of the consrtuction shown in Figure 1; and Figure 3 is a fragmentary elevational view thereof.

Motor vehicle service stations usually embody an office as at 5 in which the attendant of the service station spends considerable time, and a fuel dispensing apparatus including a plurality of pumps 6 is usually erected in front of the office with driveways 7 leading past opposite sides of the same. The present invention aims to provide means for automatically announcing the arrival of a motor vehicle at the service station when the vehicle enters either driveway so that the attendant of the service station will be properly informed for assuring prompt service to the driver of the arriving vehicle even though such arrival of the vehicle is not seen by the attendant of the station by reason of his attention to matters in the office 5. The invention essentially embodies a suitable annunciator or alarm 8 suitably mounted within the office 5 and means operable by the wheels of the vehicle entering a driveway 7 for automatically rendering the annunciator operative, such means preferably embodying an element 9 depressible by the wheels of the vehicle. As shown, the annunciator or alarm 8 is preferably of an electric character and included in a normally open circuit closed by depression of the member 9. The annunciator 8 is preferably in the nature of an electrical buzzer or bell, and where two driveways are provided for accommodation of oppositely moving vehicles as shown in Figure 1, a depressible element 9 is preferably provided at each side of the office and dispensing apparatus so as to extend transversely across both driveways in proximity to the surface of the same.

Each depressible element 9 embodies a flexible member, such as a wire or cord having one end adjustably connected, such as by means of a turn buckle 10 to a suitable anchor or stake, and having its other end yieldably connected, such as by means of a helical tension spring 12 with a further anchor or stake 13, so that the member 9 is stretched across the driveway or driveways in slightly spaced relation to and above the surface of the latter. Any suitable number of supports 14 may be associated with the intermediate portion of the member 9 for preventing sagging of the same under normal conditions. The supports 14 preferably embody pins driven into the roadway and having eyes at their upper ends through which the elements 9 freely project whereby the desired depression of each element 9 may be had as allowed by the yieldable connection 12. The adjustable connection 10 provides for taking up any slack in the element 9 as may occur from time to time whereby the element 9 may be maintained in a taut condition even though the connection 12 is stretched or lengthened after long continued use. It is apparent that the end of the element 9 which is yieldably connected as at 12 with the stake 13 will be displaced away from said stake or anchor 13 upon depression of intermediate portion of the element 9 by passage of the vehicle wheels thereover, and in order to utilize this fact for effecting operation of the annunciator 8, a contact 15 is secured to the end of the element 9 which is yieldably connected as at 12 to the anchor 13 and arranged outwardly of a cooperating contact 16 which is mounted in a fixed position at one side of a driveway 7 in the path of the contact 15. Each contact 15 is connected by a conductor 17 to one terminal of the annunciator 8, while each contact 16 is connected by a conductor 18 to one side of a source of electricity such as a battery 19, the other side of said source of electricity being connected to the remaining terminal of the annunciator 8 as shown in Figure 1. Thus, when the wheels of the motor vehicle pass over the element 9 and depress the same intermediate its ends, the contact 15 carried thereby is moved inwardly into engagement with the cooperating contact 16 so as to close the circuit of the annunciator 8 and render the latter operative so that the attendant of the service station will be notified of the arrival of the vehicle. Obviously, as soon as the wheels of the vehicle pass over the element 9, the latter will be returned to its normal taut condition by the tension spring 12 for disengaging the contact 15 from the contact 16 and rendering the annunciator inoperative. The contact 16 may be rigid with a suitable stake 20 driven into the roadway.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A vehicle actuated closing device, comprising a pair of supports designed to be rigidly fixed at opposite sides of a driveway, a flexible elongated member connected at one end to one of the supports at a point in close spaced relation to the surface of the driveway, a coil spring connected to the other end of said member and to the other support at a point in close spaced relation to the surface of the driveway, the coil spring being adapted to yieldingly support said member out of contact with the surface of the driveway, an electrical contact carried solely by and extending laterally from said member, a support designed to be fixed to the driveway at a point between said first support and the electrical contact and at that side of said member beyond which the contact extends, and an electrical contact carried by said last support.

2. A vehicle actuated circuit closing device, comprising a pair of supports designed to be rigidly fixed at opposite sides of a driveway, a flexible elongated member connected at one end to one of the supports at a point in close spaced relation to the surface of the driveway, a coil spring connected to the other end of said member and to the other support at a point in close spaced relation to the surface of the driveway, the coil spring being adapted to yieldingly support said member out of contact with the surface of the driveway, an electrical contact carried solely by and extending laterally from said member, a support designed to be fixed to the driveway at a point between said first support and the electrical contact and at that side of said member beyond which the contact extends, an electrical contact carried by said last support, and a support designed to be fixed to the driveway between said first support and said first electrical contact and provided with an eye through which said member freely passes.

In testimony whereof I affix my signature.

JAMES E. LEWIS.